United States Patent [19]

Tompkins, Jr.

[11] Patent Number: 5,645,042

[45] Date of Patent: Jul. 8, 1997

[54] GAS GRILL AFTERBURNER

[76] Inventor: Allen Coles Tompkins, Jr., P.O. Box 240, Dolores, Colo. 81323

[21] Appl. No.: 587,000

[22] Filed: Jan. 16, 1996

[51] Int. Cl.[6] .................................................. F24C 3/00
[52] U.S. Cl. ............................................................ 126/41 R
[58] Field of Search ............................ 126/41 R; 431/86, 431/121

[56] References Cited

U.S. PATENT DOCUMENTS

| | | | |
|---|---|---|---|
| 1,678,130 | 7/1928 | Tyler | 431/86 |
| 2,562,536 | 7/1951 | Mayer | 431/86 |
| 5,086,753 | 2/1992 | Berger | 126/41 R |
| 5,333,596 | 8/1994 | Clifford | 126/41 R |

*Primary Examiner*—Carroll B. Dority
*Attorney, Agent, or Firm*—Ralph F. Crandell; Dorsey & Whitney LLP

[57] ABSTRACT

A modified gas fueled barbecue grill includes a supplementary gas chamber or tank which supplies LP gas so the barbecue burners remain on for a sufficient time after cessation of use thereof to effectively burn off and clean residues from cooking food stuffs on the grill after the main fuel gas supply is turned off.

1 Claim, 3 Drawing Sheets

GAS GRILL AFTERBURNER

BACKGROUND

1. Field of the Invention

This invention relates to a means to clean a liquified petroleum (LP) gas fueled outdoor barbeque grill after it has been used for cooking food stuffs.

2. Description of the Prior Art

After cooking food stuffs on a gas fueled outdoor barbeque grill, leftover grease and other residues produced as a waste product from the cooked food stuffs remain on the grill surfaces. If the owner/user does not remove or otherwise clean the residue from the grill, the residues will become biologically unsafe. This creates a potentially harmful and unhealthy condition, as the remaining residue may contaminate future food stuffs cooked on the grill. Therefore, the grill should be cleaned of the residue.

A simple, efficient method in most common use today is to allow the burners to continue to be ignited and burn after cooking for a period of time sufficient to completely burn off the residue of the foods previously cooked. The owner/user must then remember to close the valve to conserve the fuel gas from the supply upon completion of the process.

This burn off process interrupts other activities associated with use of a gas barbeque (ie. visiting, eating, hosting, etc.) The owner/user often forgets to turn off the fuel supply valve, resulting in an undesirable, unwarranted and wasteful consumption of the fuel gas. This also creates another hazard in that a dangerous instrument remains untended until the fuel gas supply is finally exhausted. The hot, exposed surfaces and open flames of the barbeque during this untended extended burn off creates a serious fire and/or burn danger to humans, pets and structures for an unnecessarily long period of time, and also results in higher costs for the fuel gas so wasted.

The inherent nature of a barbeque grill fired by charcoal solves these problems as the burn off is at least partially completed during the period necessary for the coals to cool down and eventually extinguish.

OBJECTS OF THE INVENTION

One object of this invention described herein is to burn off effectively the food residue leaving at most a fine and biologically safe ash, with the barbeque grill clean and ready for the next use. Another objective is to accomplish the burn off process simply and to time automatically and conclude the burn off in the shortest time needed without further attention of the owner/user. A further object is to complete the burn off while conserving the fuel gas supply. The invention herein accomplishes these results.

BRIEF SUMMARY OF THE INVENTION

LP gas fueled outdoor grills consist of an LP gas supply cylinder with a flow control valve, a gas pressure regulator, and connecting hoses to the burner(s). The invention modifies a typical LP gas fueled outdoor grill by adding a small gas cylinder between the LP gas supply cylinder and the gas pressure regulator. This added small gas cylinder fills with vaporized fuel gas while the grill is being used. The added small gas cylinder is connected by means of a commercially available gas plumbing tee and hose. This allows the fuel gas from the added gas cylinder to continue to fuel the burners of the grill for a short period of time after the LP gas supply flow control valve is closed at the cessation of cooking, completing the burn off process.

BRIEF DESCRIPTION OF THE DRAWINGS

A further understanding of the invention may be derived from the detailed description of the invention given below taken in conjunction with the accompanying drawings in which.

DETAILED DESCRIPTION

Figure 1:
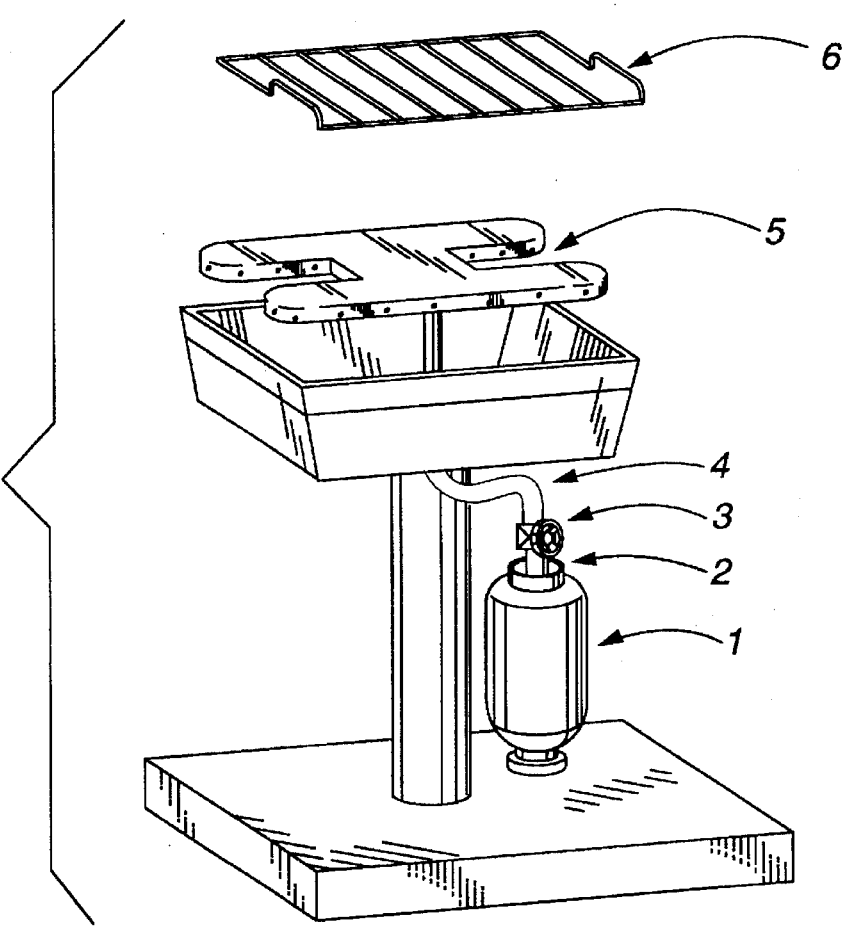
FIG. 1 is an exploded perspective view of a typical commercially available LP gas outdoor grill.

The invention consists of modifying the gas supply system of any commerically available outdoor portable or stationary, single or multiple burner grill. This grill would normally consist of a gas supply cylinder 1 (FIG. 1) providing liquified petroleum CLP) gas, a flow control valve 2 usually attached to the gas supply cylinder 1, a gas pressure regulator 3, and a gas supply hose 4 attaching the gas pressure regulator to the burner(s) 5

Figure 2:
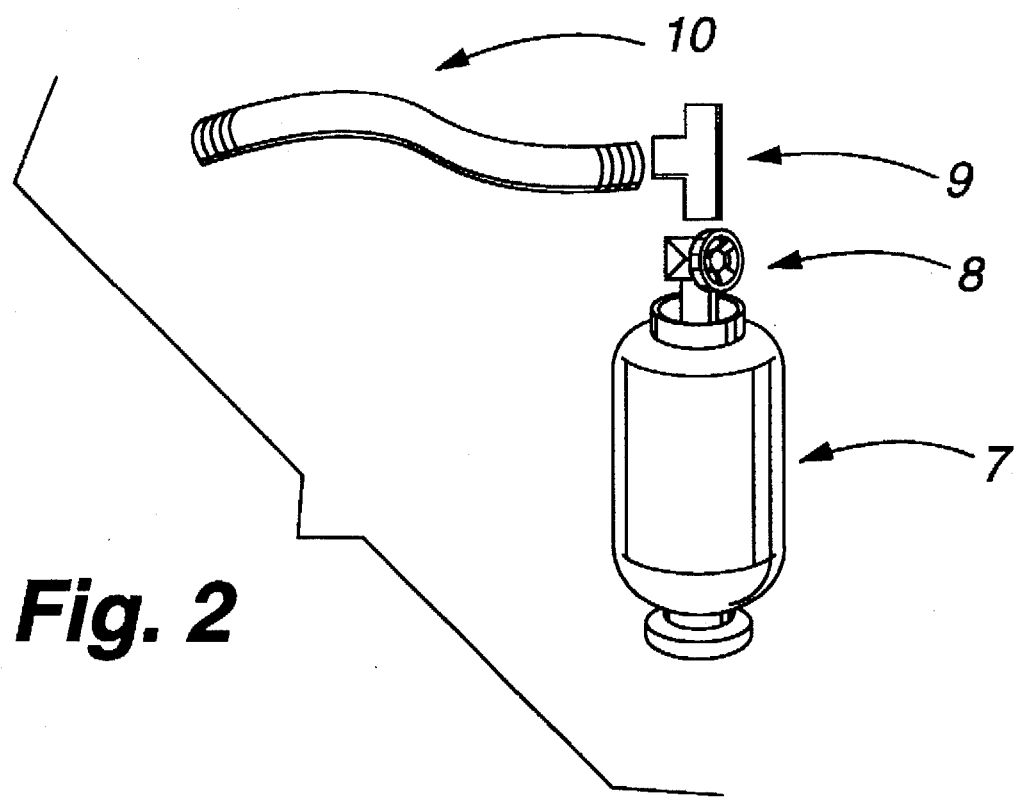
FIG. 2 is an exploded elevation view of the four pieces needed to modify a typical commercially available LP gas outdoor grill to embody the present invention.

The modification requires the use of a small commercially available gas cylinder 7 (FIG. 2), a second flow control valve 8, a commercially available gas plumbing tee 9, and a commercially available gas supply hose 10 with appropriate fittings at both ends. The gas supply hose 10 may be either flexible, rubber, poly or corrugated metal, or rigid gas piping, or a combination of the foregoing, all fitted at each end with an appropriate fitting for the connection to be made. All fittings and gas supply hoses must be approved and/or certified for use with fuel gases and are readily available commercially.

Figure 3:
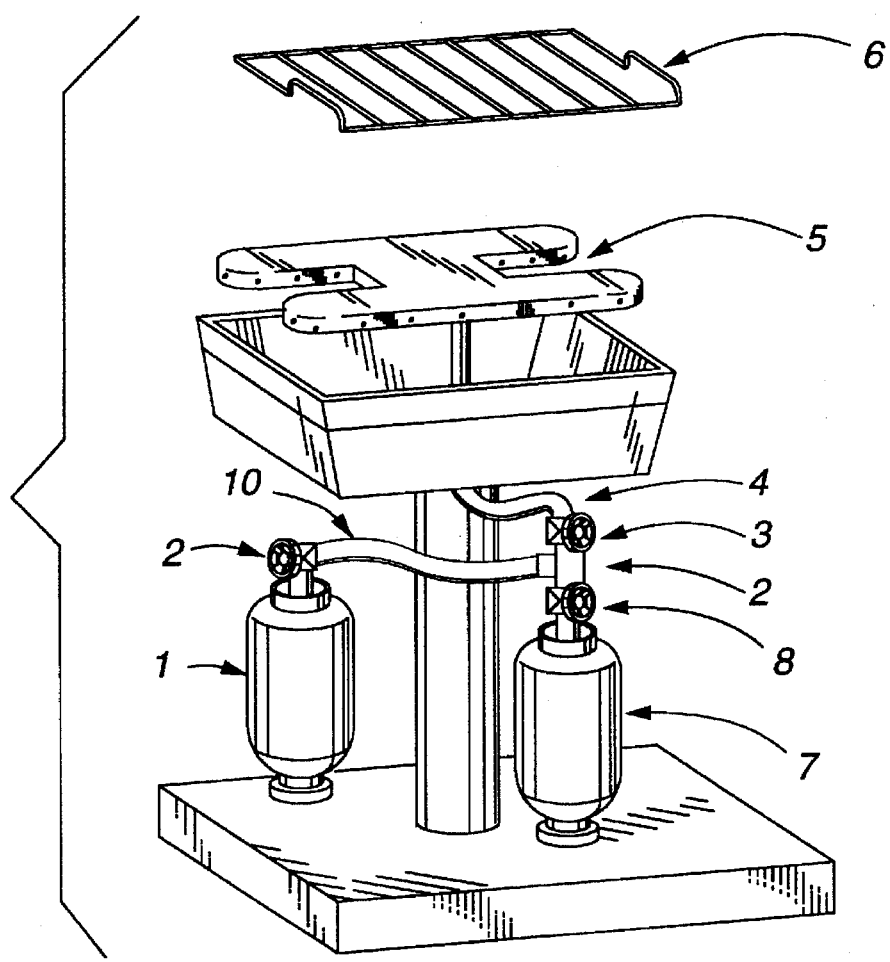
FIG. 3 is a partly exploded view of a modified LP gas grill embodying the present invention.

The modification consists of connecting the gas plumbing tee 9 (FIG. 3) on one end to the gas regulator 3 and on the other end to the gas supply hose 10 which in mm is connected to the flow control valve 2 and gas supply cylinder 1. Finally the tee is connected to the second flow control valve 8 which is connected to the small gas cylinder 7.

The added small gas cylinder 7 is sized proportionately to the size of the grill to be burned off. The larger the grill, the larger the added gas cylinder needs to be. A 5–10 pound capacity cylinder typically yields the required 15–20 minutes of burn off time.

Upon commencing cooking on the barbeque, the owner/user simply opens the flow control valve 2, ignites the fuel gas at the burners 5 and cooks. During cooking, the added gas cylinder 7 fills with vaporized fuel gas while the owner/user cooks. Upon completing cooking, the owner simply closes the flow control valve 2, allowing the vaporized fuel gas in the added gas cylinder 7 to continue fueling the burners 5. The second flow control valve 8 on the added gas cylinder 7 is left open at all times. This process is repeated each time an owner/user uses the barbeque.

When the fuel gas in the added gas cylinder 7 is consumed, the burners 5 cease ignition. The grill 6, now burned off, is clean, safe, and ready for the next barbeque cooking session without danger of fire, burns or biological hazard.

What is claimed is:

1. A method of cleaning a grill surface on a gas barbecue grill comprising:

closing a cover of said gas barbecue grill thereby enclosing a burner and a grill therein;

providing a gas supply line having a valve and gas regulator therein, one end of said gas supply line being connected to a gas source and an opposite end of said gas supply line connected to said burner, and a normally empty gas cylinder connected in open communication with said gas supply line between said gas valve and said gas regulator;

closing said gas valve and allowing gas accumulated in said gas cylinder to continue operation of said burner until said gas cylinder is substantially depleted of gas in order to burn off substances from said grill.

* * * * *